(12) United States Patent
Tsujita

(10) Patent No.: US 11,724,552 B2
(45) Date of Patent: Aug. 15, 2023

(54) TRANSMITTER FOR WHEEL ASSEMBLIES

(71) Applicant: PACIFIC INDUSTRIAL CO., LTD., Ogaki (JP)

(72) Inventor: Yasuhisa Tsujita, Motosu (JP)

(73) Assignee: PACIFIC INDUSTRIAL CO., LTD., Ogaki (JP)

(*) Notice: Subject to any disclaimer, the term of this patent is extended or adjusted under 35 U.S.C. 154(b) by 364 days.

(21) Appl. No.: 16/340,951

(22) PCT Filed: Dec. 5, 2017

(86) PCT No.: PCT/JP2017/043695
§ 371 (c)(1),
(2) Date: Aug. 26, 2021

(87) PCT Pub. No.: WO2019/111329
PCT Pub. Date: Jun. 13, 2019

(65) Prior Publication Data
US 2022/0305852 A1 Sep. 29, 2022

(51) Int. Cl.
*B60C 23/04* (2006.01)
*G08B 21/18* (2006.01)

(52) U.S. Cl.
CPC ........ *B60C 23/0408* (2013.01); *G08B 21/182* (2013.01)

(58) Field of Classification Search
CPC .......................... B60C 23/0408; G08B 21/182
See application file for complete search history.

(56) References Cited

U.S. PATENT DOCUMENTS 10,780,748 B2 * 9/2020 Takeyama ................ H04Q 9/00
2004/0206167 A1 * 10/2004 Pacsai ................ B60C 23/0408
73/146

FOREIGN PATENT DOCUMENTS

| JP | H06300837 A | 10/1994 |
| JP | H11334328 A | 12/1999 |
| JP | H06300837 | * 1/2000 |
| JP | 2005309958 A | 11/2005 |
| JP | 2005324611 A | 11/2005 |

(Continued)

OTHER PUBLICATIONS

International Search Report issued in application No. PCT/JP2017/043695, dated Mar. 13, 2018; 4 pages.

*Primary Examiner* — Curtis A Kuntz
*Assistant Examiner* — James E Munion
(74) *Attorney, Agent, or Firm* — Cantor Colburn LLP

(57) ABSTRACT

A transmitter is configured to be attached to each of wheel assemblies in a vehicle and execute a process in accordance with a command included in a trigger signal. The transmitter includes a condition detecting section, a trigger receiving section which receives, as the trigger signal, an unmodulated wave having a received signal strength indication a transmitting section, and a controlling section. When the trigger receiving section receives the unmodulated wave, the controlling section causes the transmitting section to transmit the signal in response to the unmodulated wave. The controlling section is configured to execute an accumulation process to accumulate reception time of the unmodulated wave from a starting point in time, and shift into a restriction state to restrict a response to the unmodulated wave when the accumulated reception time reaches a predetermined time.

6 Claims, 3 Drawing Sheets

(56) References Cited

FOREIGN PATENT DOCUMENTS

| JP | 2006523562 | A | | 10/2006 |
|---|---|---|---|---|
| JP | 2014091344 | A | | 5/2014 |
| JP | 2015095236 | | * | 5/2015 |
| JP | 2015095236 | A | | 5/2015 |
| JP | 2017052383 | A | | 3/2017 |

* cited by examiner

TRANSMITTER FOR WHEEL ASSEMBLIES

BACKGROUND

The present invention relates to a transmitter.

Japanese Laid-Open Patent Publication No. 2014-91344 discloses one example of a tire condition monitoring apparatus installed in a vehicle equipped with wheel assemblies. The tire condition monitoring apparatus includes transmitters, which are respectively attached to the wheel assemblies, and a receiver.

The transmitter includes a pressure sensor, which detects the pressure of the tire, a transmitting section, a controlling section, which controls the transmitter, and a battery as a power source for the transmitter. The transmitting section transmits signals. The signals include a signal that contains the detection result detected by the pressure sensor.

The transmitter also includes a trigger receiving section, which is capable of receiving a trigger signal transmitted from a trigger device. The trigger signal is transmitted from the trigger device when giving a command to the transmitter from outside. The trigger signal is transmitted to the transmitter, for example, when transmission of a signal from the transmitter at arbitrary time is desired or when the mode of the transmitter is desired to be changed. When the trigger signal is received by the trigger receiving section, the controlling section performs control in accordance with the command. When the trigger signal is received by the trigger receiving section, the controlling section performs response transmission to cause the transmitting section to transmit a signal in response to the reception of the trigger signal. This allows the trigger device to recognize that the trigger signal has been received by the trigger receiving section.

Trigger signals are of an unmodulated wave or a modulated wave. When the transmitter is compatible with trigger signals of an unmodulated wave, the trigger receiving section receives, as trigger signals, unmodulated waves having a received signal strength indication greater than or equal to a predetermined received signal strength indication.

In one or more embodiments of the present inventions, a transmitter capable of limiting an increase in power consumption of a battery. The transmitter is configured to be attached to each of the wheel assemblies provided in a vehicle and execute a process in accordance with a command included in a trigger signal. The transmitter includes a battery, which serves as a power source for the transmitter, a condition detecting section, which is configured to detect a condition of a tire, a trigger receiving section, which is configured to receive, as the trigger signal, an unmodulated wave having a received signal strength indication greater than or equal to a predetermined received signal strength indication, a transmitting section, which is configured to transmit a signal, and a controlling section, which is configured such that, when the trigger receiving section receives the unmodulated wave, the controlling section causes the transmitting section to transmit the signal in response to the unmodulated wave. The controlling section is configured to execute an accumulation process to accumulate reception time of the unmodulated wave from a starting point in time and to shift into a restriction state to restrict a response to the unmodulated wave when the accumulated reception time reaches a predetermined time.

With this configuration, the response to an unmodulated wave is restricted if the accumulated time of reception of an unmodulated wave reaches the predetermined time in a case in which the vehicle is in an environment where an unmodulated wave that may be misidentified as the trigger signal is transmitted. This limits an increase in the power consumption of the battery due to responses to unmodulated waves.

In one or more other embodiments, a transmitter is provided that is configured to be attached to each of wheel assemblies provided in a vehicle and execute a process in accordance with a command included in a trigger signal. The transmitter includes a battery, which serves as a power source for the transmitter, a condition detecting section, which is configured to detect a condition of a tire, a trigger receiving section, which is configured to receive, as the trigger signal, an unmodulated wave having a received signal strength indication greater than or equal to a predetermined received signal strength indication, a transmitting section, which is configured to transmit a signal, and a controlling section, which is configured such that, when the trigger receiving section receives the unmodulated wave, the controlling section causes the transmitting section to transmit the signal in response to the unmodulated wave. The controlling section is configured to execute an accumulation process to accumulate a number of times of the signal transmitted from the transmitting section from a starting point in time in response to the unmodulated wave and to shift into a restriction state to restrict a response to the unmodulated wave when the accumulated number of times reaches a predetermined number of times.

With this configuration, the response to an unmodulated wave is restricted when the number of times of transmission of a signal transmitted in response to an unmodulated wave reaches the predetermined number of times in a case in which the vehicle is in an environment where an unmodulated wave that may be misidentified as the trigger signal is transmitted. This limits an increase in the power consumption of the battery due to responses to unmodulated waves.

The above-described transmitter includes a traveling detecting section, which detects traveling and stopping of the vehicle. The controlling section may be configured to execute the accumulation process when the vehicle is at a stopped state.

When the vehicle is traveling, the surrounding environment of the vehicle changes as the vehicle moves. Therefore, when the vehicle is traveling, the transmitter is unlikely to continue to receive an unmodulated wave different from the trigger signal over a long period of time. In contrast, when the vehicle is at a stopped state, the transmitter may continue to receive an unmodulated wave different from the trigger signal over a long period of time. By carrying out the accumulation process when the vehicle is at a stopped state, the transition to the restriction state is properly performed.

The above-described transmitter includes a traveling detecting section, which detects traveling and stopping of the vehicle. The controlling section may be configured to execute, based on detection of stopping of the vehicle by the traveling detecting section, transition to a response state, in which response to the unmodulated wave is not restricted, and setting of the starting point in time.

With this configuration, it is possible to cause the controlling section to shift into the response state in the wake of stopping of the vehicle.

In the above-described transmitter, the trigger receiving section may be capable of receiving a trigger signal of a modulated wave, and the controlling section may be configured to execute, based on reception of the trigger signal of a modulated wave by the trigger receiving section, transition to a response state, in which response to the unmodulated wave is not restricted.

With this configuration, it is possible to cause the controlling section to shift into the response state at arbitrary time by using the trigger device capable of transmitting a trigger signal of a modulated wave.

In the above-described transmitter, the condition detecting section may include a pressure sensor that detects a pressure of the tire, and the controlling section may be configured to execute, based on a condition in which a fluctuation value per unit time of a pressure detected by the pressure sensor exceeds a predetermined value, transition to a response state, in which response to the unmodulated wave is not restricted.

In a case where the fluctuation value per unit time of the pressure of the tire exceeds the predetermined value, the tire may be inspected using a trigger device. When the fluctuation value per unit time of the pressure of the tire exceeds the predetermined value, the controlling section shifts into the response state. Thus, it is possible to suppress the occurrence of a situation in which it is impossible to inspect the tire although the fluctuation value per unit time of the pressure of the tire has exceeded the predetermined value.

DETAILED DESCRIPTION OF THE INVENTION

A transmitter according to a first embodiment will now be described. One of the problems with prior art transmitters is that the transmitters generally move with movement of the vehicle. Therefore, the surrounding environment of the transmitters changes with movement of the vehicle. Depending on the surrounding environment, unmodulated waves of the same frequency band as the trigger signal frequency band or a frequency band approximate to the trigger signal frequency band are being transmitted. When such an unmodulated wave is received by the trigger receiving section, the transmitting section transmits a signal in response to the unmodulated wave. Therefore, depending on the surrounding environment, the transmitter can misidentify an unmodulated wave different from the trigger signal as a trigger signal, so that response transmission is repeatedly performed. This may increase the power consumption of the battery and shorten the life of the transmitter. In the present disclosure, the transmitter is configured to overcome the problems noted in the prior art.

Figure 1:
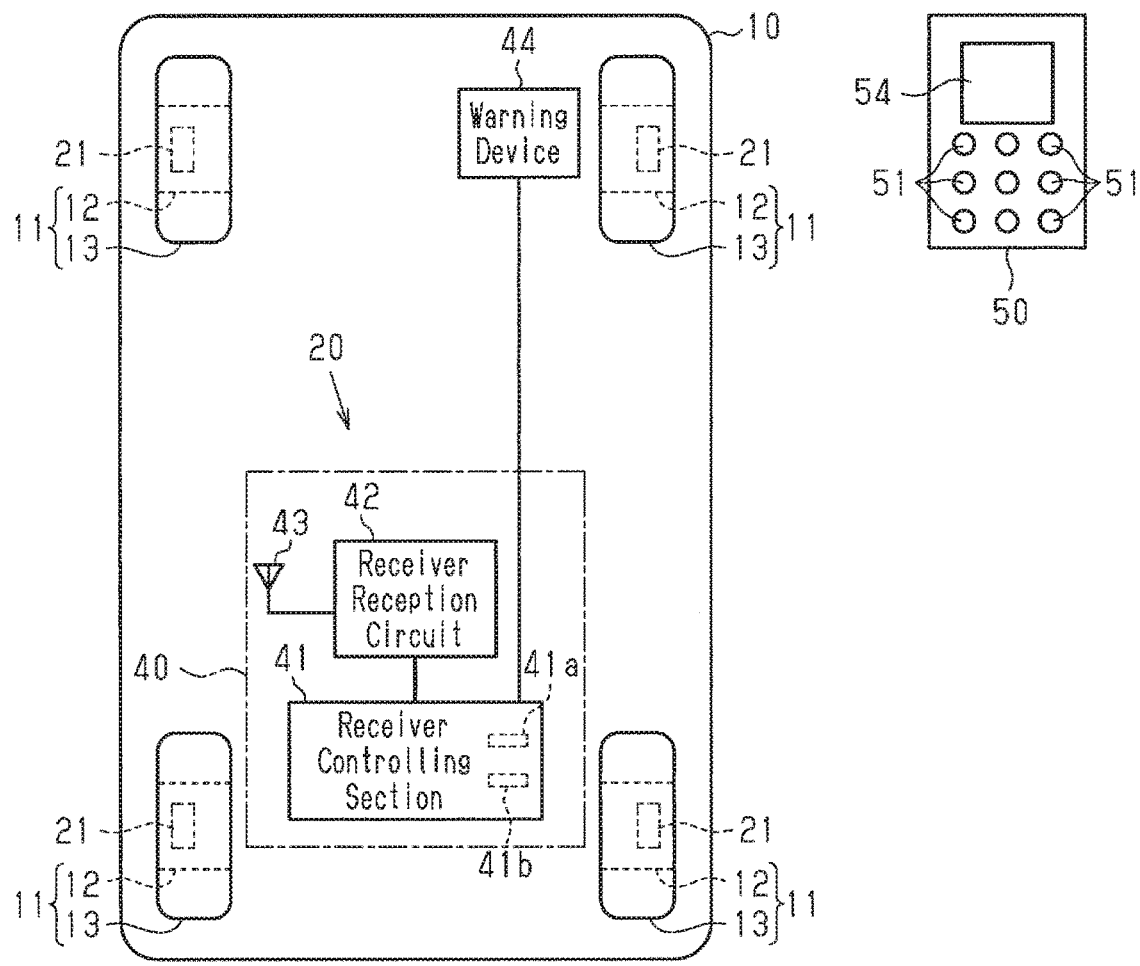
FIG. 1 is a schematic diagram of a tire condition monitoring apparatus and a trigger device.

As shown in FIG. 1, a tire condition monitoring apparatus 20 includes transmitters 21 and a receiver 40. Each transmitter 21 is configured to be attached to one of the four wheel assemblies 11 of a vehicle 10. The receiver 40 is installed in the vehicle 10. Each of the wheel assemblies 11 includes a wheel 12 and a tire 13 attached to the wheel 12. Each transmitter 21 is of a type that is fixed to the tire valve, the wheel 12, or the tire 13.

The transmitter 21 is attached to the wheel assembly 11 so as to be arranged in the inner space of the tire 13. The transmitter 21 detects the condition of the corresponding tire 13, for example, the air pressure and internal temperature of the tire 13 and wirelessly transmits a signal including the detection results to the receiver 40. The tire condition monitoring apparatus 20 monitors the conditions of the tires 13 by receiving signals transmitted from the transmitters 21 at the receiver 40.

Figure 2:
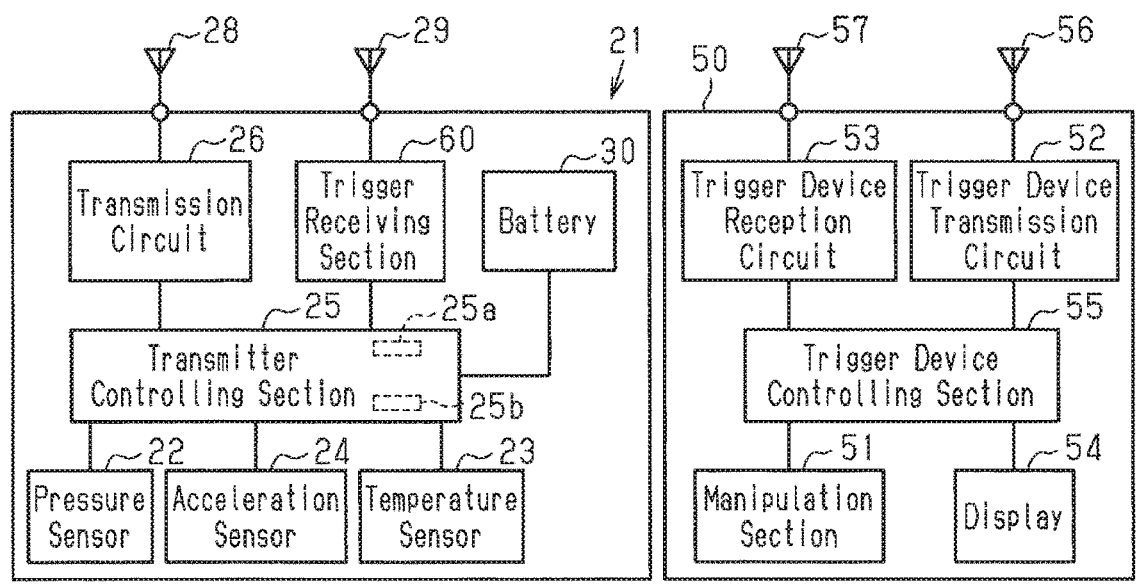
FIG. 2 is a schematic diagram of a transmitter and the trigger device.

As shown in FIG. 2, the transmitter 21 includes a pressure sensor 22, a temperature sensor 23, an acceleration sensor 24, a transmitter controlling section 25, a transmission circuit 26, a transmission antenna 28, a reception antenna 29, a battery 30, and a trigger receiving section 60. The battery 30 serves as a power source for the transmitter 21.

The pressure sensor 22 detects the pressure (air pressure) of the corresponding tire 13. The pressure sensor 22 outputs the detection result to the transmitter controlling section 25. The temperature sensor 23 detects the temperature inside the corresponding tire 13. The temperature sensor 23 outputs the detection result to the transmitter controlling section 25.

The acceleration sensor 24 rotates integrally with the wheel assembly 11 to detect the centrifugal acceleration acting on the wheel assembly 11. The acceleration sensor 24 outputs the detection result to the transmitter controlling section 25. In the present embodiment, the pressure sensor 22, the temperature sensor 23, and the acceleration sensor 24 constitute a condition detecting section that detects the condition of the tire 13.

The transmitter controlling section 25, which serves as a controlling section, is composed of circuitry such as a microcomputer including a CPU 25a and a memory section 25b (such as a RAM and a ROM). The transmitter controlling section 25 includes a timing function. An ID code, which is identification information unique to each transmitter 21, is registered in the memory section 25b. The memory section 25b stores various programs for controlling the transmitter 21.

The transmitter controlling section 25 may include dedicated hardware (application specific integrated circuit: ASIC) that executes at least part of various processes. That is, the transmitter controlling section 25 may be circuitry including 1) one or more processors that operate according to a computer program (software), 2) one or more dedicated hardware circuits such as an ASIC, or 3) a combination thereof. The processor includes a CPU and memory such as a RAM and ROM. The memory stores program codes or instructions configured to cause the CPU to execute processes. The memory, or computer readable medium, includes any type of medium that is accessible by general-purpose computers and dedicated computers.

The transmitter controlling section 25 generates data and outputs it to the transmission circuit 26. The transmission circuit 26, which functions as a transmitting section, modulates the data from the transmitter controlling section 25 to generate a signal (RF signal), and transmits the signal through the transmission antenna 28. For example, the transmitter controlling section 25 generates data including the ID code and the tire condition, which includes the detection result of the pressure sensor 22 and the detection result of the temperature sensor 23. The transmitter controlling section 25 transmits a data signal, which includes the data.

The transmitter controlling section 25 determines whether the vehicle 10 is traveling based on the detection result of the acceleration sensor 24. The centrifugal acceleration acting on the wheel assembly 11 increases as the speed of the vehicle 10 increases. The transmitter controlling section 25 determines that the vehicle 10 is traveling when the centrifugal acceleration detected by the acceleration sensor 24 exceeds a preset threshold value. The threshold value is set to a value greater than the centrifugal acceleration detected when the vehicle 10 is at a stopped state. In the present embodiment, the acceleration sensor 24 functions as a Traveling detecting section.

As shown in FIG. 1, the receiver 40 includes a receiver controlling section 41, a receiver reception circuit 42, and a reception antenna 43. A warning device 44 is connected to the receiver controlling section 41. The receiver controlling section 41 is composed of a microcomputer including a receiver CPU 41a and a receiver memory section 41b (such as a ROM and a RAM). The receiver reception circuit 42 demodulates data signals transmitted from the transmitters 21 and received via the reception antenna 43 and delivers the demodulated signals to the receiver controlling section 41.

The receiver controlling section 41 obtains the condition of the tire 13 based on the data included in the data signal transmitted from the transmitter 21. When an anomaly occurs in any of the tires 13, the receiver controlling section 41 performs notification by using the warning device (notification device) 44. For example, the warning device 44 may be a device that notifies the user of the anomaly with sound or illumination or blinking of light. Also, the receiver controlling section 41 may display the condition of the tire 13 on the display unit that the occupants of the vehicle 10 can visually recognize.

The transmitter 21 can perform various actions in response to a trigger signal transmitted from a trigger device 50. The trigger signal may be, for example, a signal for requesting the transmitter 21 to transmit a data signal, a signal for requesting the transmitter 21 to change the transmission interval of data signals, a signal for requesting the transmitter 21 to register an ID code in the memory section 25b, and a signal for updating the software of the transmitter 21. The trigger device 50 is found, for example, at maintenance facilities such as dealers and production bases such as a factory that manufactures the transmitters 21 and a factory where the transmitters 21 are attached to the wheel assemblies 11.

Hereinafter, the trigger device 50 and the trigger receiving section 60 of the transmitter 21 will be described.

As shown in FIGS. 1 and 2, the trigger device 50 includes multiple manipulation sections 51, a trigger device transmission circuit 52, a trigger device reception circuit 53, a display 54, a trigger device controlling section 55, a trigger device transmission antenna 56, and a trigger device reception antenna 57. The manipulation sections 51 are manipulated by the user. The user of the trigger device 50 can specify operations that the transmitter 21 is requested to do by operating the manipulation sections 51. The trigger device 50 transmits a trigger signal requesting an operation corresponding to the manipulation of the manipulation sections 51.

The manipulation sections 51 are connected to the trigger device controlling section 55. The trigger device controlling section 55 generates data in response to manipulation of the manipulation sections 51. This data includes a command option that is a command to the transmitter 21.

The trigger device controlling section 55 outputs the generated data to the trigger device transmission circuit 52.

The trigger device transmission circuit 52 generates a trigger signal corresponding to the data. The trigger signal is transmitted from the trigger device transmission antenna 56.

The trigger device reception circuit 53 receives a data signal (RF signal) transmitted (returned) from the transmitter 21 via the trigger device reception antenna 57. The trigger device reception circuit 53 demodulates the data signal and outputs it to the trigger device controlling section 55.

The types of the trigger device 50 include the one that employs carrier detect and the one that employs telegram as the communication method. The carrier detect is a method that uses an unmodulated wave as the trigger signal. The telegram is a method that uses a modulated wave as the trigger signal.

Figure 3A:
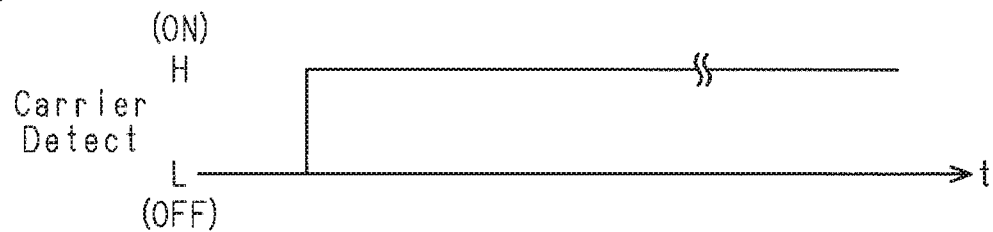
FIG. 3A is a schematic diagram showing a trigger signal of an unmodulated wave.

As shown in FIG. 3A, when the trigger device 50 employs the carrier detect, an unmodulated wave in an LF band (for example, 125 kHz band) is used as the trigger signal.

Figure 3B:
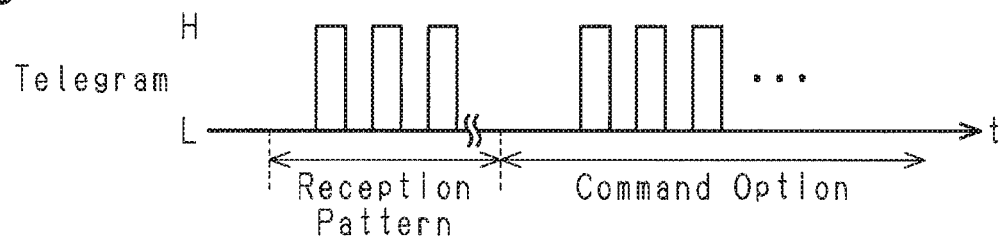
FIG. 3B is a schematic diagram showing a trigger signal of a modulated wave.

As shown in FIG. 3B, when the trigger device 50 employs the telegram, a modulated wave in an LF band (for example, 125 kHz band) is used as the trigger signal. A signal obtained by modulating a digital signal obtained by encoding data of 73 bits in total is used as the trigger signal. The encoding is executed, for example, by Manchester code. The modulation is executed, for example, with amplitude shift keying (ASK).

The above-mentioned 73-bit data includes a command option and a reception pattern (pattern including a preamble, a synchronization bit, and a wake-up ID) for causing the trigger receiving section 60 to recognize that it is a trigger signal. The reception pattern is defined by the telegram and is always the same. The command option differs depending on the action the transmitter 21 is requested to perform. The command option can request the transmitter 21 to perform the action corresponding to the manipulation section 51. The above data is not limited to 73-bit data but may have other data lengths.

Next, the trigger receiving section 60 of the transmitter 21 will be described.

Figure 4:
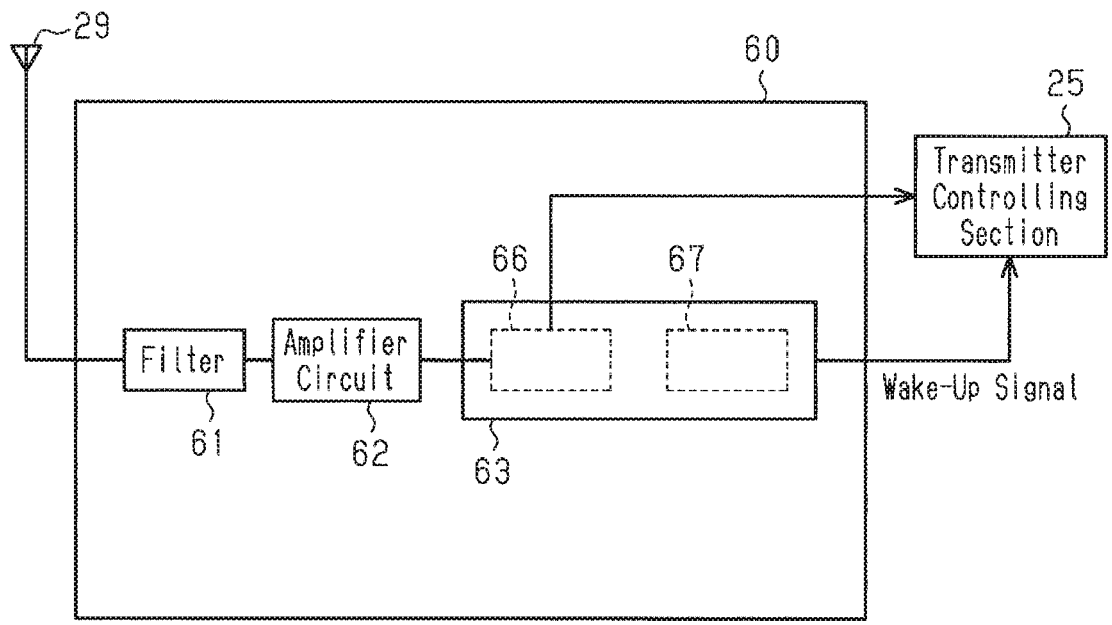
FIG. 4 is a schematic diagram showing the trigger receiving section.

As shown in FIG. 4, the trigger receiving section 60 includes a filter 61, which passes only a signal of a specific frequency band out of signals arriving at the reception antenna 29, an amplifier circuit 62, which amplifies a signal passing through the filter 61, and a determination section (determination circuit) 63, which determines whether the amplified signal is a trigger signal.

The filter 61 removes noise by permitting passage of signals of, for example, an LF band (for example, a 125 kHz band). The amplifier circuit 62 is composed of, for example, an amplifier of which the gain is variable or multiple amplifiers having different gains.

The trigger receiving section 60 of the present embodiment is capable of receiving both of the trigger signal of an unmodulated wave and a trigger signal of a modulated wave. The determination section 63 includes a first determination section 66 (first determination function), which determines whether a received signal is a trigger signal of an unmodulated wave, and a second determination section 67 (second determination function), which determines whether a received signal is a trigger signal of a modulated wave.

The first determination section 66 determines whether the received signal strength indication (RSSI) [dBm] of an unmodulated wave is greater than or equal to a predetermined RSSI. The first determination section 66 determines that an unmodulated wave of the RSSI of which is greater than or equal to the predetermined RSSI is a trigger signal of an unmodulated wave. The predetermined RSSI is set in advance according to, for example, the output of the trigger device 50.

The second determination section 67 determines whether the reception pattern included in a signal matches with a preset reception pattern (reception pattern defined by the telegram). The second determination section 67 determines that a signal is a trigger signal when the reception pattern included in that signal matches with a preset reception pattern. The determination section 63 alternately repeats the determination by the first determination section 66 and the determination by the second determination section 67. Accordingly, the determination section 63 is capable of receiving both of a trigger signal of an unmodulated wave and a trigger signal of a modulated wave.

The determination section 63 has a function of sending a wake-up signal to the transmitter controlling section 25. Since there are only a few opportunities to receive trigger signals, the transmitter controlling section 25 turns off the reception function until receiving a wake-up signal to save power. The transmitter controlling section 25 acquires a trigger signal upon reception of the wake-up signal. As a result, the transmitter controlling section 25 recognizes the action requested by the trigger device 50. "Reception" in the trigger receiving section 60 refers to causing the transmitter controlling section 25 to receive the data included in a trigger signal.

When the trigger receiving section 60 receives a trigger signal, the transmitter controlling section 25 performs response transmission to cause the transmission circuit 26 to transmit a signal in response to the reception of the trigger signal. The signal transmitted by response transmission is a signal for informing the trigger device 50 that a trigger signal has been received. If response transmission is not performed, it can be said that the transmitter 21 cannot perform any operation in response to the trigger signal. By receiving a signal transmitted by response transmission, the trigger device 50 can recognize that the transmitter 21 has received the trigger signal.

The transmitter controlling section 25 can be in a response state and a restriction state as reception states when an unmodulated wave is received by the trigger receiving section 60. The response state is a state in which a response to an unmodulated wave is not restricted, and a signal is transmitted in response to an unmodulated wave. The restriction state is a state in which the response to unmodulated waves is restricted. In the present embodiment, the restriction state is a state in which response to an unmodulated wave is not performed. In either state, the response to a trigger signal of modulated wave is performed.

The transmitter controlling section 25 switches between the response state and the restriction state according to whether a predefined condition is met. The switching between the response state and the restriction state will be described below.

The transmitter controlling section 25 executes an accumulation process to measure reception time of an unmodulated wave from a starting point in time and accumulates the reception time. When an unmodulated wave continues being received, the accumulation of the reception time of the unmodulated wave is the duration of that reception. When an unmodulated wave is received intermittently, the accumulation is the accumulated time of the time when the unmodulated wave is received.

The transmitter controlling section 25 performs the accumulation process from the starting point in time and shifts into the restriction state when the accumulated reception time reaches a predetermined time. The "predetermined time" is, for example, time during which it can be determined that an unmodulated wave is not the trigger signal. When a trigger signal is transmitted by trigger device 50, the transmission of the trigger signal is stopped if response transmission from the transmitter 21 is received or when response transmission cannot be received for a period longer than time that is set in advance. By setting the predetermined time to be longer than the time that is set in advance, it can be determined that the unmodulated wave received for a period exceeding the predetermined time is not a trigger signal.

The transmitter controlling section 25 executes the accumulation process when the centrifugal acceleration detected by the acceleration sensor 24 is lower than the threshold value. As a result, the accumulation process is executed while the vehicle 10 is determined to be at a stopped state by the transmitter controlling section 25.

In the present embodiment, the setting of the starting point in time is performed based on stopping of the vehicle 10, reception of the trigger signal of a modulated wave, and abrupt pressure change of the tire 13. The setting of the starting point in time can be regarded as resetting of the reception time of an unmodulated wave, which has been accumulated in the accumulation process. Since the starting point in time is set, the restriction state will be canceled if the reception state of the transmitter controlling section 25 is the restriction state. When the restriction state is canceled, the transmitter controlling section 25 shifts into the response state. When the starting point in time is set, the response state will be maintained if the reception state of the transmitter controlling section 25 is the response state.

The transmitter controlling section 25 sets the starting point in time based on the detection of stopping of the vehicle 10. Specifically, the transmitter controlling section 25 sets the starting point in time when the centrifugal acceleration has changed from a value greater than or equal to the threshold value to a value below the threshold value. The transmitter controlling section 25 may set the starting point in time to a point in time at which stopping of the vehicle 10 is detected. Alternatively, the transmitter controlling section 25 may set the starting point in time to a point in time a few seconds to several minutes after stopping of the vehicle 10 is detected. That is, when the starting point in time is set based on detection of stopping of the vehicle 10, the starting point in time is set within an allowable range from the point in time when the vehicle 10 is stopped. Also, upon detecting stopping of the vehicle 10, the transmitter controlling section 25 shifts into the response state. This allows the transmitter 21 to respond to a trigger signal of an unmodulated wave.

When receiving a trigger signal of a modulated wave, the transmitter controlling section 25 sets the starting point in time based on the reception. The trigger signal of a modulated wave may be one that requests setting of the starting point in time or one that requests transmission of a signal including data indicating the state of the tire 13. That is, the starting point in time may be set by a dedicated command option. Alternatively, the starting point in time may be set when a trigger signal of a modulated wave is received irrespective of the command option. The transmitter controlling section 25 may set the starting point in time to a point in time at which a trigger signal is received or a point in time a few seconds after receiving a trigger signal. That is, when the starting point in time is set based on the reception of a trigger signal of a modulated wave, the starting point in time is set within an allowable range from the point in time when the trigger receiving section 60 receives a trigger signal. Also, upon reception of a trigger signal of a modulated wave, the transmitter controlling section 25 shifts into the response state.

When an abrupt change in pressure occurs in the tire 13, the transmitter controlling section 25 sets the starting point in time based on that pressure change. The transmitter controlling section 25 determines that the pressure of the tire 13 has changed abruptly when the fluctuation value per unit time of the pressure detected by the pressure sensor 22 exceeds a predetermined value. The predetermined value is greater than the pressure of the tire 13, which naturally decreases with the traveling of the vehicle 10 and the passage of time. The transmitter controlling section 25 may set the starting point in time to a point in time when an abrupt change in pressure occurs in the tire 13. Alternatively, the transmitter controlling section 25 may set the starting point in time to a point in time a few seconds to several minutes after the occurrence of such an abrupt change in pressure of the tire 13. That is, when the starting point in time is set based on an abrupt change in pressure of the tire 13, the starting point in time is set within an allowable range from the point in time when the transmitter controlling section 25 detects the abrupt change in pressure. Also, when an abrupt pressure change of the tire 13 occurs, the transmitter controlling section 25 enters into the response state.

An operation of the transmitter 21 of the present embodiment will now be described.

It is now assumed that the vehicle 10 travels and stops. Depending on the surrounding environment of the vehicle 10, an unmodulated wave in the same frequency band as a trigger signal or in a frequency band approximate to the trigger signal may be transmitted continuously. For example, in a parking lot or on a freeway, there are cases where LF signals are output in or about the 125 kHz band in order to detect the vehicle 10.

When an unmodulated wave other than a trigger signal is misidentified as a trigger signal by the trigger receiving section 60, the transmitter controlling section 25 performs response transmission in response to the unmodulated wave. While the unmodulated wave continues to be received, a signal is transmitted from the transmission circuit 26 intermittently through response transmission. The transmitter controlling section 25 shifts into the restriction state when the reception time of the unmodulated wave reaches the predetermined time. In the restriction state, the transmitter controlling section 25 does not perform response transmission even when receiving an unmodulated wave.

Figure 5:
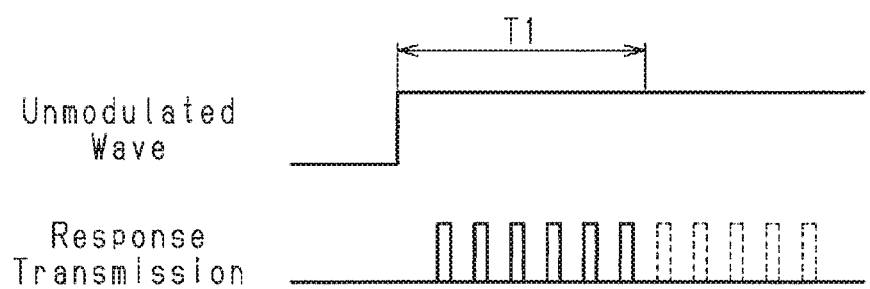
FIG. 5 is a diagram showing the relationship between an unmodulated wave that is transmitted continuously and response transmission.
Figure 6:
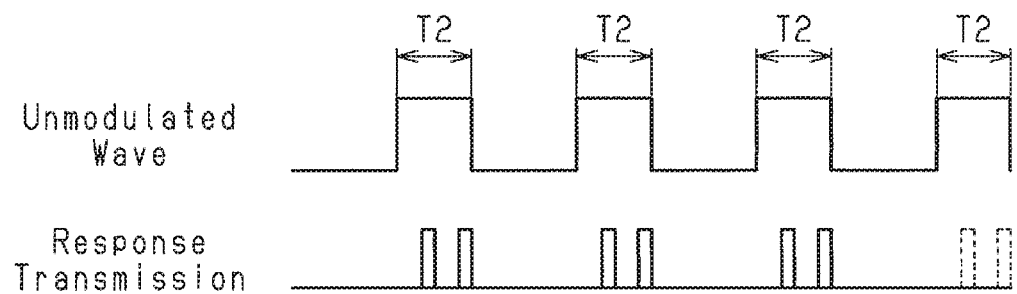
FIG. 6 is a diagram showing the relationship between an unmodulated wave that is transmitted intermittently and response transmission.

It is now assumed that a transmitter is used that measures the time during which it continuously receives an unmodulated wave and shifts into the restriction state when the measured time exceeds the predetermined time. In this case, as shown in FIG. 5, the transmitter controlling section can shift into the restriction state when receiving the continuously transmitted unmodulated wave. However, as shown in FIG. 6, when an intermittently transmitted unmodulated wave is received, the time for which the unmodulated wave has been received is reset by the interruption of the unmodulated wave. Therefore, in a surrounding environment in which an unmodulated wave is transmitted intermittently, response transmission by the transmitter controlling section may be repeatedly performed.

In the present embodiment, the reception time of a trigger signal is accumulated from the starting point in time, and response transmission is restricted in accordance with the accumulated reception time. Therefore, in a case in which an unmodulated wave is transmitted continuously as shown in FIG. 5, the transmitter controlling section 25 can shift into the restriction state when the reception time of the unmodulated wave reaches the predetermined time T1. Also, even in a case in which an unmodulated wave is transmitted intermittently as shown in FIG. 6, the reception time T2 of the intermittently received unmodulated wave is accumulated from the starting point in time. That is, when the accumulated reception time (3×T2) reaches the predetermined time, the transmitter controlling section 25 can shift into the restriction state. Therefore, even in a surrounding environment in which an intermittent unmodulated wave is being transmitted, the transmitter controlling section 25 can shift into the restriction state.

When the vehicle 10 travels, the restriction state is canceled and the transmitter controlling section 25 shifts into the response state. When the vehicle 10 travels, it is assumed that the vehicle 10 will move to another location from the location where an unmodulated wave other than a trigger signal is being transmitted. That is, it is assumed that the vehicle 10 will move to a location where it is not necessary to restrict response transmission. Since the restriction state is cancelled by traveling of the vehicle 10, it becomes possible to issue a command to the transmitter 21 with a trigger signal.

Also, even if the transmitter controlling section 25 receives a trigger signal of a modulated wave, the restriction state of the transmitter controlling section 25 is canceled, so that the transmitter controlling section 25 shifts into the response state. When the transmitter controlling section 25 receives a trigger signal of a modulated wave, it is assumed that the vehicle 10 is at a stopped state at a maintenance facility such as a dealer. In this case, a command may be given to transmitter 21 with a trigger signal of an unmodulated wave in order to inspect the transmitter 21. By transmitting a trigger signal of a modulated wave using the trigger device 50 compatible with telegram, the restriction state can be canceled even when the transmitter 21 is in the restriction state.

The restriction state of the transmitter controlling section 25 is canceled and the transmitter controlling section 25 shifts into the response state even when an abrupt pressure change of the tire 13 occurs. When an abrupt pressure change of the tire 13 occurs, it is assumed that an anomaly has occurred in the wheel assembly 11. In this case, the tire 13 may be inspected by causing the transmitter 21 to transmit a signal with the trigger device 50. Therefore, in such a case, the transmitter controlling section 25 shifts into the response state so as to be capable of transmitting a signal in response to an unmodulated wave.

It is also conceivable to restrict response transmission to an unmodulated wave by reducing the sensitivity to unmodulated waves. However, in a case in which one trigger receiving section 60 is compatible with both a trigger signal of a modulated wave and a trigger signal of an unmodulated wave as in the present embodiment, it is difficult to largely differentiate between the sensitivity to a modulated wave and the sensitivity to an unmodulated wave. Accordingly, reduction in the sensitivity to an unmodulated wave will reduce the sensitivity to a modulated wave. It is possible to determine whether a modulated wave is a trigger signal through matching of the reception patterns. For this reason, it is unlikely that a modulated wave other than a trigger signal will be misidentified as a trigger signal, and it is unnecessary to reduce the sensitivity. If the sensitivity to a modulated wave is reduced together with the sensitivity to an unmodulated wave, it will be necessary to increase the output of the trigger device 50 compatible with telegram and operate the trigger device 50 in proximity to the transmitter 21.

In contrast, in the present embodiment, response to an unmodulated wave can be restricted without reducing the sensitivity by restricting response transmission in the wake of the reception time of an unmodulated wave.

Accordingly, the first embodiment has the following advantages.

(1-1) The transmitter controlling section 25 accumulates the reception time for which an unmodulated wave is received and restricts response transmission when the accumulated reception time reaches the predetermined time. This prevents a signal from being transmitted continuously in response to an unmodulated wave. Therefore, it is possible to restrict an increase in power consumption of the battery 30 as compared with a case where response transmission is continuously performed as long as an unmodulated wave continues to be received. This extends the life of the battery 30 and consequently extends the life of the transmitter 21.

(1-2) The accumulation process is performed while the vehicle 10 is at a stopped state. When the vehicle 10 is traveling, the surrounding environment of the vehicle 10 changes as the vehicle 10 moves. Therefore, when the vehicle 10 is traveling, the transmitter 21 is unlikely to continue to receive an unmodulated wave different from the trigger signal over a long period of time. In contrast, in a case in which the vehicle 10 is at a stopped state, there is a risk that the transmitter 21 will be exposed, for an extended period of time, to an environment where an unmodulated wave that can be misidentified as a trigger signal continues to be transmitted. In this case, response transmission may be performed over a long period of time. By carrying out the accumulation process when the vehicle 10 is at a stopped state, the transition to the restriction state is properly performed.

(1-3) The transmitter controlling section 25 shifts into the response state in the wake of stopping of the vehicle 10. When giving a command to the transmitter 21, the trigger device 50 is caused to transmit a trigger signal with the vehicle 10 at a stopped state. Accordingly, the transmitter controlling section 25 shifts into the response state in a situation in which the trigger device 50 is used. This allows the transmitter controlling section 25 to perform an operation in response to a command from the trigger device 50.

Also, the transmitter controlling section 25 sets the starting point in time in the wake of stopping of the vehicle 10. That is, each time the vehicle 10 moves, the accumulation of the reception time of an unmodulated wave is reset. Therefore, the transmitter controlling section 25 can determine whether to shift into the restriction state in accordance with the surrounding environment of the vehicle 10.

(1-4) The transmitter controlling section 25 shifts into the response state based on the reception of a triggered signal of a modulated wave. Thus, it is possible to cause the transmitter controlling section 25 to shift into the response state at arbitrary time by using the trigger device 50 capable of transmitting a trigger signal of a modulated wave.

(1-5) The transmitter controlling section 25 shifts into the response state based on an abrupt change in the pressure of the tire 13. When an abrupt change in pressure occurs, the transmitter controlling section 25 shifts into the response state, so that the tire 13 can be inspected using the trigger device 50.

In another embodiment, a transmitter according to a second embodiment will now be described. The detailed description of the components that are the same as those in the first embodiment will be omitted.

The transmitter controlling section 25 of the second embodiment is configured to perform an accumulation process of accumulating the number of times signals are transmitted by response transmission. The transmitter controlling section 25 performs the accumulation process from the starting point in time and shifts into the restriction state when the number of times of signal transmission reaches a predetermined number of times. The "predetermined number of times" is the number of times that response transmission is performed when, for example, an unmodulated wave is received for the predetermined time of the first embodiment.

In the example shown in FIGS. 5 and 6, the transmitter controlling section 25 shifts into the restriction state when response transmission is performed six times. For the purpose of illustration, the predetermined number of times is six in FIGS. 5 and 6, however, the predetermined number of times can be set to any value within a range from several times to several tens of times as necessary.

There is a proportional relationship between the reception time and the number of times a signal is transmitted by response transmission. Therefore, even when the number of times of reception transmission is accumulated by the accumulation process, the same advantages as those of the first embodiment are obtained.

In the second embodiment, the restriction state and the response state are switched by the same control as in the first embodiment Accordingly, in addition to the advantages (1-2) to (1-5) of the first embodiment, the second embodiment has the following advantage.

(2-1) The number of times of signal transmission from the transmission circuit 26 by the response to an unmodulated wave is accumulated, and response transmission is restricted when the accumulated number of times exceeds the predetermined number of times. This prevents a signal from being transmitted continuously in response to an unmodulated wave. Therefore, it is possible to restrict an increase in power consumption of the battery 30 as compared with a case where response transmission is continuously performed as long as an unmodulated wave continues to be received. This extends the life of the battery 30 and consequently extends the life of the transmitter 21.

The various embodiments described herein may be modified as follows. In each of the above-described embodiments, the transition to the response state and the setting of the starting point in time may be performed based on any one of stopping of the vehicle 10, reception of a trigger signal of a modulated wave, and an abrupt change in pressure of the tire 13. Also, the transition to the response state and the setting of the starting point in time may be performed based on any two of stopping of the vehicle 10, reception of a trigger signal of a modulated wave, and an abrupt change in pressure of the tire 13. That is, it is only necessary to perform the transition to the response state and the setting of the starting point in time based at least one of stopping of the vehicle 10, reception of a trigger signal of a modulated wave, and an abrupt change in pressure of the tire 13.

If the transition to the response state and the setting of the starting point in time are not performed based on reception of a trigger signal of a modulated wave, the trigger receiving section 60 may be made unable to receive a trigger signal of a modulated wave. That is, the transmitter 21 may be compatible only with a trigger signal of an unmodulated wave (carrier detect).

The transition to the response state and the setting of the starting point in time may be performed based on the condition that the fluctuation value per unit time of the temperature detected by the temperature sensor 23 exceeds a predetermined value. That is, the transition to the response state and the setting of the starting point in time may be performed when there is an abrupt change in temperature. In addition, in a case in which the transmitter controlling section 25 determines whether a failure has occurred in any of the condition detecting sections such as the pressure sensor 22 and the temperature sensor 23, the transition to the response state and the setting of the starting point in time may be performed based on the detection of a failure in the condition detecting section.

Further, the transition to the response state and the setting of the starting point in time may be performed based on traveling of the vehicle 10. Since the accumulation process is not performed while the vehicle 10 is traveling, the same advantages as in the case where the transition to the response state and the setting of the starting point in time are performed based on stopping of the vehicle 10 are obtained.

In each of the above-described embodiments, the transmitter controlling section 25 may shift into only to the response state based on the reception of a triggered signal of a modulated wave. That is, it is not necessary to set the starting point in time based on the reception of a trigger signal of a modulated wave. Likewise, in each of the above-described embodiments, the transmitter controlling section 25 may shift into only to the response state based on an abrupt change in pressure of the tire 13. That is, it is not necessary to set the starting point in time based on an abrupt change in pressure of the tire 13. In these cases, the setting of the starting point in time is performed when traveling of the vehicle 10 is detected, when stopping of the vehicle 10 is detected after traveling of the vehicle 10, and when a trigger signal including a command requesting the setting of the starting point in time is received.

In each of the above-described embodiments, the accumulation process may be performed during traveling of the vehicle 10 in addition to a stopped state of the vehicle 10. In this case, the traveling detecting section may be omitted.

In each of the above-described embodiments, sensors other than the acceleration sensor 24 such as a shock sensor, an angular velocity sensor, a magnetic sensor may be used as the traveling detecting section.

The accumulation process of the first embodiment and the accumulation process of the second embodiment may be employed together. The accumulation of the reception time of an unmodulated wave reaching the predetermined time in the accumulation process of the first embodiment is defined as a first condition. Also, the number of times of response transmission reaching the predetermined number of times in the accumulation process in the second embodiment is defined as a second condition. In this case, the transmitter controlling section 25 may shift into the response state when the first condition or the second condition is met. Alternatively, the transmitter controlling section 25 may shift into the response state when both the first condition and the second condition are met.

In each of the above-described embodiments, it is only necessary to provide, as the condition detecting section, at least one of the pressure sensor 22, the temperature sensor 23, and the acceleration sensor 24.

In each of the above-described embodiments, the frequency band of the trigger signal may be changed as necessary.

In each of the above-described embodiments, it is only necessary that the restriction state be a state in which response transmission is restricted as compared with the response state. In other words, it is sufficient if the power consumption of the battery 30 by response transmission is lower than that in the response state. For example, the restriction state may be a state in which the frequency of transmitting the signal from the transmission circuit 26 by response transmission is less than that in the response state. In the restriction state, the output of a signal transmitted from the transmission circuit 26 by response transmission may be lower than that in the response state. The restriction state may be a state in which the data length of a signal transmitted from the transmission circuit 26 by response transmission is shorter than that in the response state.

In each of the above-described embodiments, the vehicle 10 may be a motorcycle or a vehicle having five or more wheel assemblies 11.

The descriptions of the various embodiments of the present invention have been presented for purposes of illustration, but are not intended to be exhaustive or limited to the embodiments of the invention described. Many modifications and variations will be apparent to those of ordinary skill in the art without departing from the scope and spirit of the described embodiments of the invention. The terminology used herein was chosen to best explain the principles of the embodiments of the invention, the practical application or technical improvement over technologies found in the marketplace, or to enable others of ordinary skill in the art to understand the embodiments of the invention described herein.

The invention claimed is:

1. A transmitter configured to be attached to each of wheel assemblies provided in a vehicle and execute a process in accordance with a command included in a trigger signal, and configured to receive power from a battery, the transmitter comprising:
   a condition detecting section, which is configured to detect a condition of a tire;
   a trigger receiving section, which is configured to receive, as the trigger signal, an unmodulated wave having a received signal strength indication greater than or equal to a predetermined received signal strength indication;
   a transmitting section, which is configured to transmit a signal;
   a controlling section, which is configured such that, when the trigger receiving section receives the unmodulated wave, the controlling section causes the transmitting section to transmit the signal in response to the unmodulated wave; and
   a traveling detecting section, which detects traveling and stopping of the vehicle,
   wherein the controlling section is configured to
      execute an accumulation process to accumulate reception time of the unmodulated wave from a starting point in time,
      shift into a restriction state to restrict a response to the unmodulated wave when the accumulated reception time reaches a predetermined time, and
      execute the accumulation process when the vehicle is at a stopped state, and wherein the controlling section is configured to execute, based on detection of stopping of the vehicle by the traveling detecting section, transition to a response state, in which response to the unmodulated wave is not restricted, and setting of the starting point in time.

2. A transmitter configured to be attached to each of wheel assemblies provided in a vehicle and execute a process in accordance with a command included in a trigger signal, and configured to receive power from a battery, the transmitter comprising:
- a condition detecting section, which is configured to detect a condition of a tire;
- a trigger receiving section, which is configured to receive, as the trigger signal, an unmodulated wave having a received signal strength indication greater than or equal to a predetermined received signal strength indication;
- a transmitting section, which is configured to transmit a signal;
- a controlling section, which is configured such that, when the trigger receiving section receives the unmodulated wave, the controlling section causes the transmitting section to transmit the signal in response to the unmodulated wave; and
- a traveling detecting section, which detects traveling and stopping of the vehicle,
wherein the controlling section is configured to
  execute an accumulation process to accumulate a number of times of the signal transmitted from the transmitting section from a starting point in time in response to the unmodulated wave,
  shift into a restriction state to restrict a response to the unmodulated wave when the accumulated number of times reaches a predetermined number of times, and
  execute the accumulation process when the vehicle is at a stopped state, and wherein the controlling section is configured to execute, based on detection of stopping of the vehicle by the traveling detecting section, transition to a response state, in which response to the unmodulated wave is not restricted, and setting of the starting point in time.

3. The transmitter according to claim 1, wherein
the trigger receiving section is capable of receiving a trigger signal of a modulated wave, and
the controlling section is configured to execute, based on reception of the trigger signal of a modulated wave by the trigger receiving section, transition to a response state, in which response to the unmodulated wave is not restricted.

4. The transmitter according to claim 1, wherein
the condition detecting section includes a pressure sensor that detects a pressure of the tire, and
the controlling section is configured to execute, based on a condition in which a fluctuation value per unit time of a pressure detected by the pressure sensor exceeds a predetermined value, transition to a response state, in which response to the unmodulated wave is not restricted.

5. The transmitter according to claim 2, wherein
the trigger receiving section is capable of receiving a trigger signal of a modulated wave, and
the controlling section is configured to execute, based on reception of the trigger signal of a modulated wave by the trigger receiving section, transition to a response state, in which response to the unmodulated wave is not restricted.

6. The transmitter according to claim 2, wherein
the condition detecting section includes a pressure sensor that detects a pressure of the tire, and
the controlling section is configured to execute, based on a condition in which a fluctuation value per unit time of a pressure detected by the pressure sensor exceeds a predetermined value, transition to a response state, in which response to the unmodulated wave is not restricted.

* * * * *